(No Model.) 3 Sheets—Sheet 1.
W. A. HULL.
CRACKER CUTTING MACHINE.
No. 447,113. Patented Feb. 24, 1891.
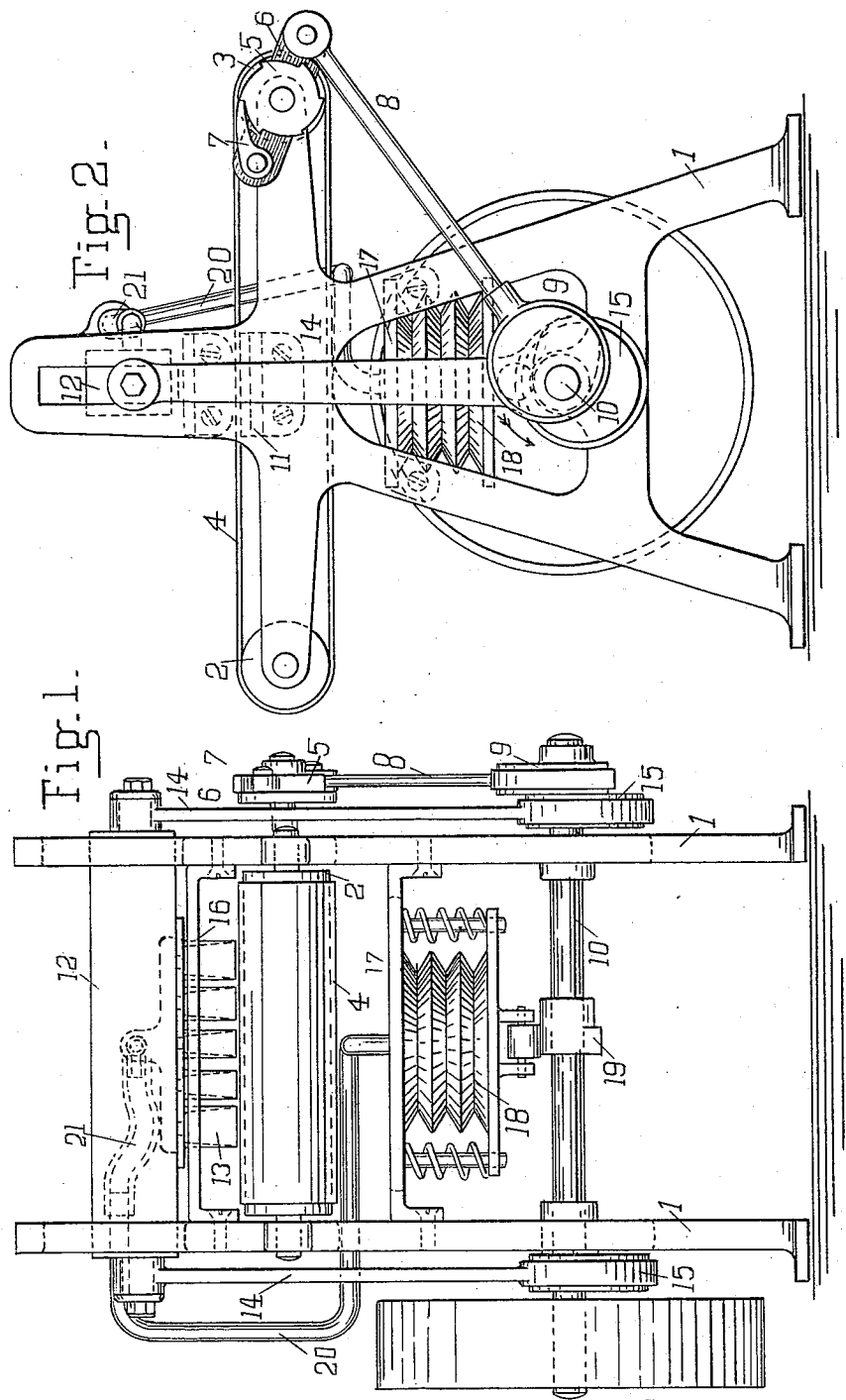
Witnesses:
G. W. Balch
S. O. Edmonds
Inventor:
Wolcott A. Hull

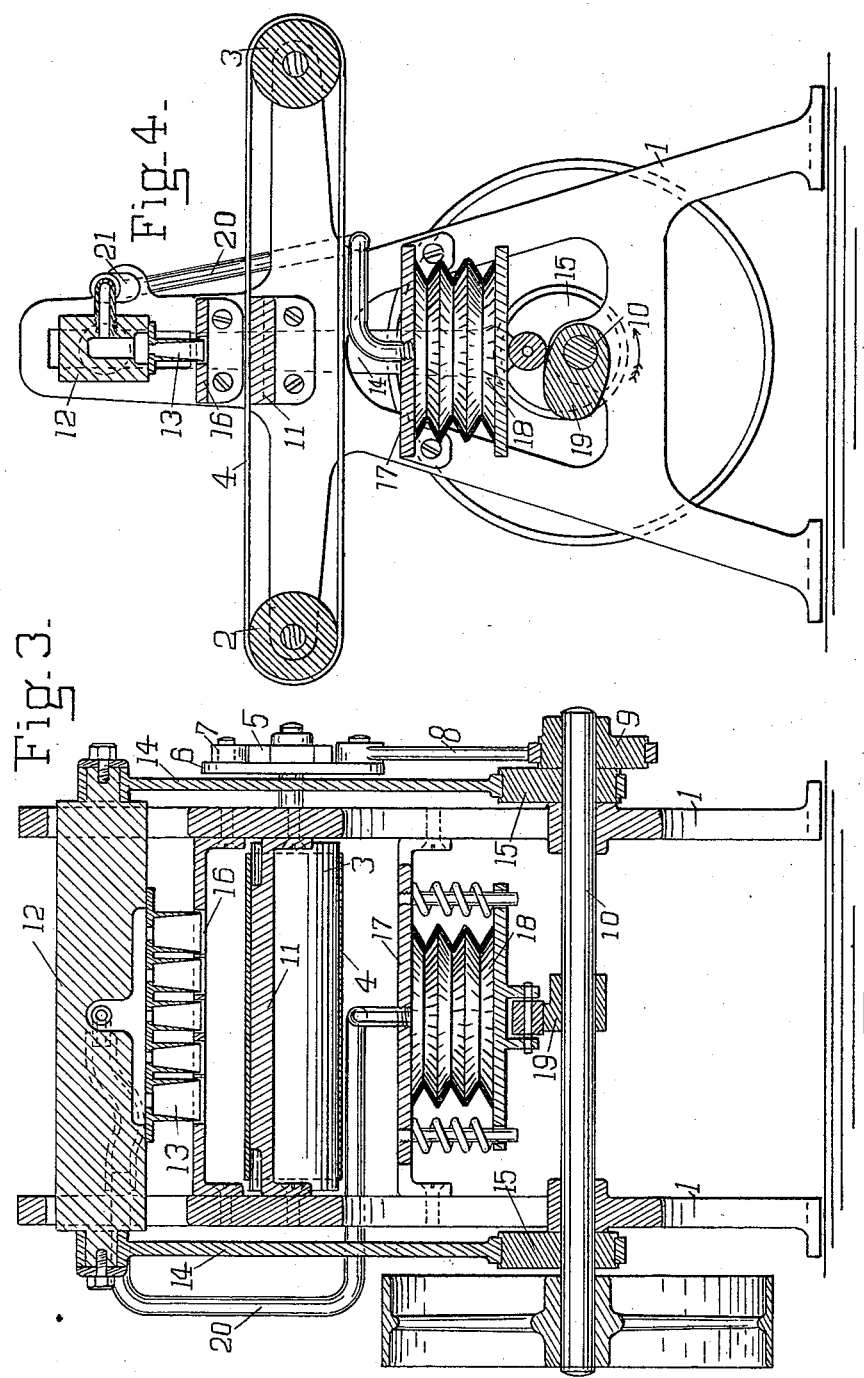

(No Model.) 3 Sheets—Sheet 3.

W. A. HULL.
CRACKER CUTTING MACHINE.

No. 447,113. Patented Feb. 24, 1891.

Witnesses:
C. W. Balch
S. O. Edmonds

Inventor:
Wolcott A. Hull

UNITED STATES PATENT OFFICE.

WOLCOTT A. HULL, OF NEW YORK, N. Y.

CRACKER-CUTTING MACHINE.

SPECIFICATION forming part of Letters Patent No. 447,113, dated February 24, 1891.

Application filed September 29, 1890. Serial No. 366,428. (No model.)

*To all whom it may concern:*

Be it known that I, WOLCOTT A. HULL, of New York, in the county and State of New York, have invented a certain new and useful Improvement in Cracker-Cutting Machines, of which the following is a specification.

The elements of my invention herein disclosed are intended for use in connection with cracker and cake machinery which prepares and rolls out the sheet of dough. These elements, however, may form a complete machine that will receive on a carrier a sheet of dough or similar elastic material formed by hand or in any well-known manner and by the co-operation of the several parts cut the cakes from this sheet and leave them resting on the carrier, which brings the sheet of dough under the cutters.

The improvement comprises an endless belt or carrier passing over rollers to carry the sheet, one or more cutters which are reciprocated above this carrier and are shaped to conform to the contours to be given to the crackers or cakes, an air or other gas pump communicating with the cutters, and mechanism by which all are actuated from a shaft in such time that the parts move in proper succession, the carrier first feeding the sheet under the cutters, then the cutters descending and cutting out the cakes, and lastly the air-pump injecting an air or other gas blast as the cutters rise, whereby the cakes are held down on the carrier as these cutters lift away. Combinations of these elements, as hereinafter set forth in the claims, constitute my present improvement.

Figure 5:
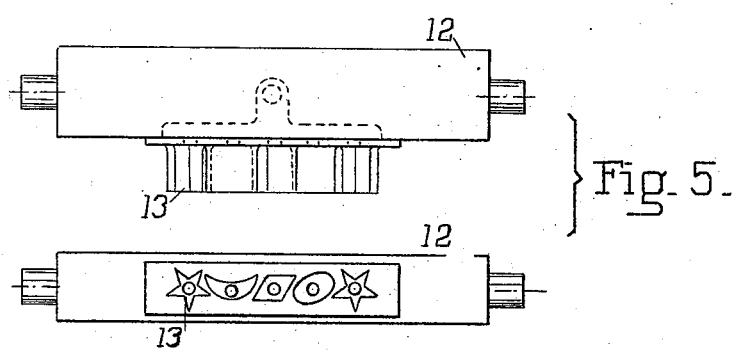
Figure 6:
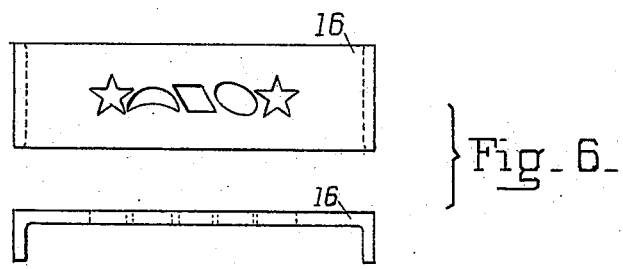

In the accompanying drawings, Figure 1 is a view of a machine embodying my improvement, taken at the end where the sheet of dough is received. Fig. 2 is a side view. Figs. 3 and 4 are middle sections viewed in the same directions as Figs. 1 and 2, respectively, and with the mechanism in positions assumed on revolving the main shaft through half a revolution from the position drawn in the first two views. Fig. 5 shows the cutter-head with the cutters attached as viewed from the side and underneath. Fig. 6 shows the stripper-plate through which these cutters reciprocate.

Similar numerals of reference designate corresponding parts in all the figures.

This machine is organized with two side frames 1 1, in which the several shafts are journaled, and by which the other elements are supported or guided. Wings on these frames support rollers 2 and 3, over which passes a belt or carrier 4. The shaft through the roll 3 is extended at one end and carries a ratchet 5. An arm 6, loosely mounted on the above shaft, carries a pawl 7 to engage the teeth of the ratchet and feed the carrier forward with an intermittent motion when the arm is oscillated. A pitman 8, the lower end of which surrounds an eccentric 9, imparts the necessary oscillating motion to the above arm when the main shaft 10 is revolved. A plate 11, fastened to the side frames and forming part of the frame-work, supports the flexible carrier where the cutting takes place upon it.

Vertical slots in the side frames guide a cutter-head 12, bearing the cutters 13. The edges of these cutters are of oval, polygonal, or similar closed outline which it may be desired to impart to a cracker or like article. Pitman-rods 14 14 between journals on this cutter-head and eccentrics 15 15 on the main shaft communicate the requisite motion when this shaft is revolved, and thus the cutters are brought down solidly upon the carrier through the sheet of dough resting upon it to cut out the crackers or like articles and are lifted away at the proper time, whereupon the feeding of the sheet by the carrier is done. A stripper 16, fastened to the frame, lies above the carrier and has openings through which the cutters pass.

A plate 17, fastened to the side frames and forming part of the frame-work, carries an air or other gas pump 18, which is shown as made in the form of bellows. This air-pump is actuated by a cam 19, which is so placed on the main shaft relative to the eccentrics reciprocating the cutter-head that a blast of air or other gas will be given as the cutters withdraw after cutting out the cakes when the shaft is revolved in the proper direction, as shown by the arrow. An air-pipe 20 leads the air or other gas blast from the air-pump to the cutter-head, in which are channels through which this blast finds a passage to the cutters. A section 21 of the air-pipe is of flexible material, so that the cutter-head may be moved while communication is maintained with it.

In using my invention it will customarily be placed in connection with the mechanism of a cracker-machine which prepares and rolls out the dough from which the crackers are to be cut into a sheet. The carrier receives this sheet and brings a new portion to the cutters and carries the cut portion beyond each time they lift away after cutting out the cakes. During the lifting away of the cutters the gas-blast comes to the inclosed space between them and the cakes they have cut and by its pressure holds them down on the carrier.

I do not wish to be restricted to the use of my improvement for making crackers.

What I claim as my invention, and desire to secure by Letters Patent, is—

1. The combination of a carrier, a cutter or former operating with sufficient pressure to cut or form an article presented by the carrier, a gas-duct communicating with said cutter or former, and means whereby after the cutting or forming of such article a gas-blast will be caused to pass through said duct to effect the detachment of the article from the cutter or former, substantially as specified.

2. The combination, with a support for material, of a cutter or former movable to bear upon said support, a duct through which a gas-blast is furnished to the same, and means whereby after the cutting or forming of such article a gas-blast will be caused to pass through said duct to effect the detachment of formed material from the cutter or former, substantially as specified.

3. The combination of a carrier, a cutter or former operating with sufficient pressure to cut or form an article presented by the carrier, a gas-duct communicating with said cutter or former, a pump communicating with the said duct, and means for operating the pump to produce a gas-blast at the cutter or former after the cutting or forming operation to effect the detachment of the cut or shaped article from the cutter or former, substantially as specified.

WOLCOTT A. HULL.

Witnesses:
S. O. EDMONDS,
WM. A. POLLOCK.